(12) United States Patent
Cook et al.

(10) Patent No.: US 6,907,046 B1
(45) Date of Patent: Jun. 14, 2005

(54) COMMUNICATION SYSTEM AND DEVICE THAT PROVIDES SERVICE INDEPENDENT COMMUNICATION BRIDGING

(75) Inventors: Fred S. Cook, Olathe, KS (US); Ferry J. Gailliaert, Overland Parks, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1014 days.

(21) Appl. No.: 09/801,225

(22) Filed: Mar. 7, 2001

(51) Int. Cl.[7] .................................................. H04J 3/16
(52) U.S. Cl. ...................................... 370/466; 709/224
(58) Field of Search ................................ 370/389, 398, 370/400, 401, 402, 465, 467; 709/201, 202, 238, 244, 223, 224

(56) References Cited

U.S. PATENT DOCUMENTS

| | | | | |
|---|---|---|---|---|
| 5,351,287 A | * | 9/1994 | Bhattacharyya et al. | 379/93.02 |
| 5,745,558 A | * | 4/1998 | Richardson et al. | 379/207.01 |
| 5,883,945 A | * | 3/1999 | Richardson et al. | 379/189 |
| 6,061,363 A | * | 5/2000 | Evans et al. | 370/467 |
| 6,134,618 A | * | 10/2000 | Hebert | 710/105 |
| 6,311,238 B1 | * | 10/2001 | Hebert | 710/65 |
| 6,389,130 B1 | * | 5/2002 | Shenoda et al. | 379/221.08 |
| 6,529,504 B1 | * | 3/2003 | Sbisa | 370/385 |
| 6,611,591 B1 | * | 8/2003 | McNiff et al. | 379/268 |
| 6,631,133 B1 | * | 10/2003 | Christie et al. | 370/395.2 |

* cited by examiner

Primary Examiner—Bob A. Phunkulh (57) ABSTRACT

A communication device automatically transfers a software application to a bridge agent in response to an operational control channel between the communication device and the bridge agent. The bridge agent executes the software application to translate a bridge request into a bridge command. The bridge agent transfers the bridge command to the communication device. The communication device receives the bridge command through a physical port dedicated to bridge control. The communication device processes the bridge command to implement a bridge.

22 Claims, 5 Drawing Sheets

COMMUNICATION SYSTEM AND DEVICE THAT PROVIDES SERVICE INDEPENDENT COMMUNICATION BRIDGING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication systems and devices that provide communication bridges under the control of a bridge agent.

2. Description of the Prior Art

A communication device transfers user communications between users. The communication device has a control system and a communication fabric. The communication fabric routes the user communications. The control system processes control information related to the communications to control the communication fabric.

A communication device provides a communication bridge by copying the user communications that are transferred to another user and transferring the copy to a third party. For example, consider that a communication device transfers user communications between User A and User B. The communication device can provide a communication bridge by transferring a copy of the user communications to an agent C. A communication device also provides a communication bridge by transferring third party communications to the users along with the user communications. In the above example, the communication device can provide a communication bridge by transferring agent C communications to User A and User B along with the user communications.

One example of communication bridging occurs when an operator must interrupt an on-going user communication to provide information to a user. For example, an operator may interrupt a voice communication to inform a user of an emergency. Another example of communication bridging occurs when a law enforcement agency directs a communication system to transfer a copy of user communications to them. For example, the Federal Bureau of Investigation (FBI) may require a communication system to provide the FBI with a voice tap—a live copy of user voice communications without the knowledge of the users. A tap is a passive one-way bridge, and the term "bridge" includes taps.

At present, bridge control protocols for communication devices are specific to the device manufacturer and are usually proprietary. Unfortunately, communication systems are increasingly comprised of different communication devices from diverse manufacturers. Thus, the communication system must have a complex bridge control system because the diverse array of communication devices use different bridge control protocols, such as SGCP, MGCP, or others.

In the computer field, peripheral devices, such as printers and modems, are connected to a computer. The computer is configured with an operating system and device drivers. The device drivers provide a software interface between the operating system and the peripheral devices. The peripheral devices must be able to interpret the instructions from the device drivers. Typically, the peripheral device manufacturer provides software device drivers that are compatible with their peripheral devices and also with commercial operating systems. In some cases, a peripheral device may automatically transfer their software driver to a common registry for use by any system that needs to control the peripheral device. Unfortunately, this device driver technology has not been effectively applied to provide better control of communication bridging.

SUMMARY OF THE INVENTION

The invention helps solve the above problems with communication systems, devices, and methods to implement bridges. The invention uses software applications to interface between a bridge agent and various communication devices. Advantageously, the software applications allow the bridge agent to use a common bridge request format that greatly simplifies bridge agent design and operation. The software applications translate the common bridge requests into various bridge commands that are customized to the various communication devices. Thus, the bridge agent uses a common request format, but the communication devices may retain their own proprietary command formats.

Some examples of the invention include a communication system and method of operation. A first communication device automatically transfers a first software application to the bridge agent in response to an operational control channel between the first communication device and the bridge agent. The bridge agent executes the first software application to translate a first bridge request into a first bridge command. The bridge agent transfers the first bridge command to the first communication device. The first communication device receives the first bridge command through a first physical port dedicated to bridge control. The first communication device processes the first bridge command to implement a first bridge.

The bridge agent executes a second software application to translate a second bridge request into a second bridge command. The bridge agent transfers the second bridge command from the bridge agent to a second communication device. The second communication device receives the second bridge command through a second physical port dedicated to bridge control. The second communication device processes the second bridge command to implement a second bridge.

The first bridge may copy all user communications transferred from a first user to a link and transfer the copies to the bridge agent. The first bridge may copy all user communications transferred from a link to a first user and transfer the copies to the bridge agent. The first bridge may transfer agent communications from the bridge agent to a first user. The first communication device and the second communication device may be from different manufacturers. The first bridge request and the second bridge request may have the same format, but the first bridge command and the second bridge command may have different formats.

Some examples of the invention include a communication device and method of operation. The communication device has a physical port dedicated to a bridge agent. The communication device has a bridge control coupled to the physical port and configured to automatically transfer a software application to the bridge agent in response to an operational control channel between the physical port and the bridge agent. The bridge control is configured to receive and process a bridge command to generate control signals. The communication device has a communication fabric configured to implement a bridge in response to the control signals.

BRIEF DESCRIPTION OF THE DRAWINGS

The same reference number represents the same element on all drawings.

DETAILED DESCRIPTION OF THE PREFERRED EMBODIMENT

Figure 1:
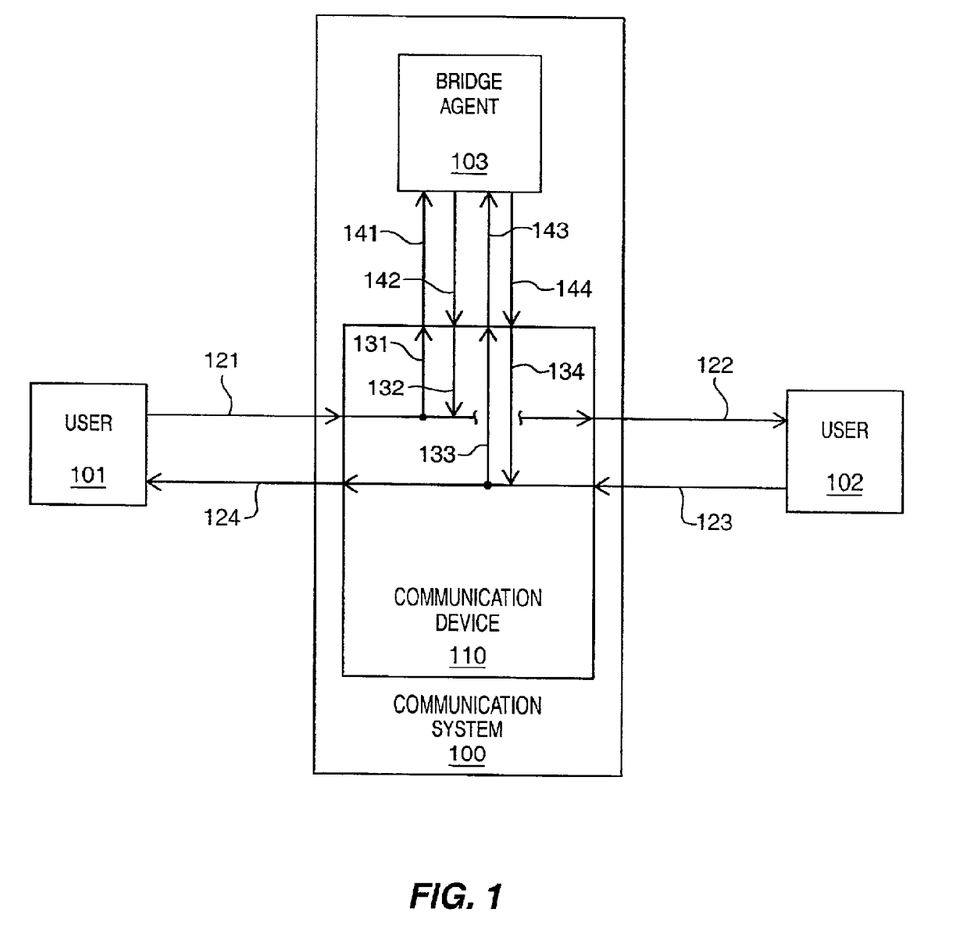
FIG. 1 illustrates a communication system in an example of the invention.
Figure 2:
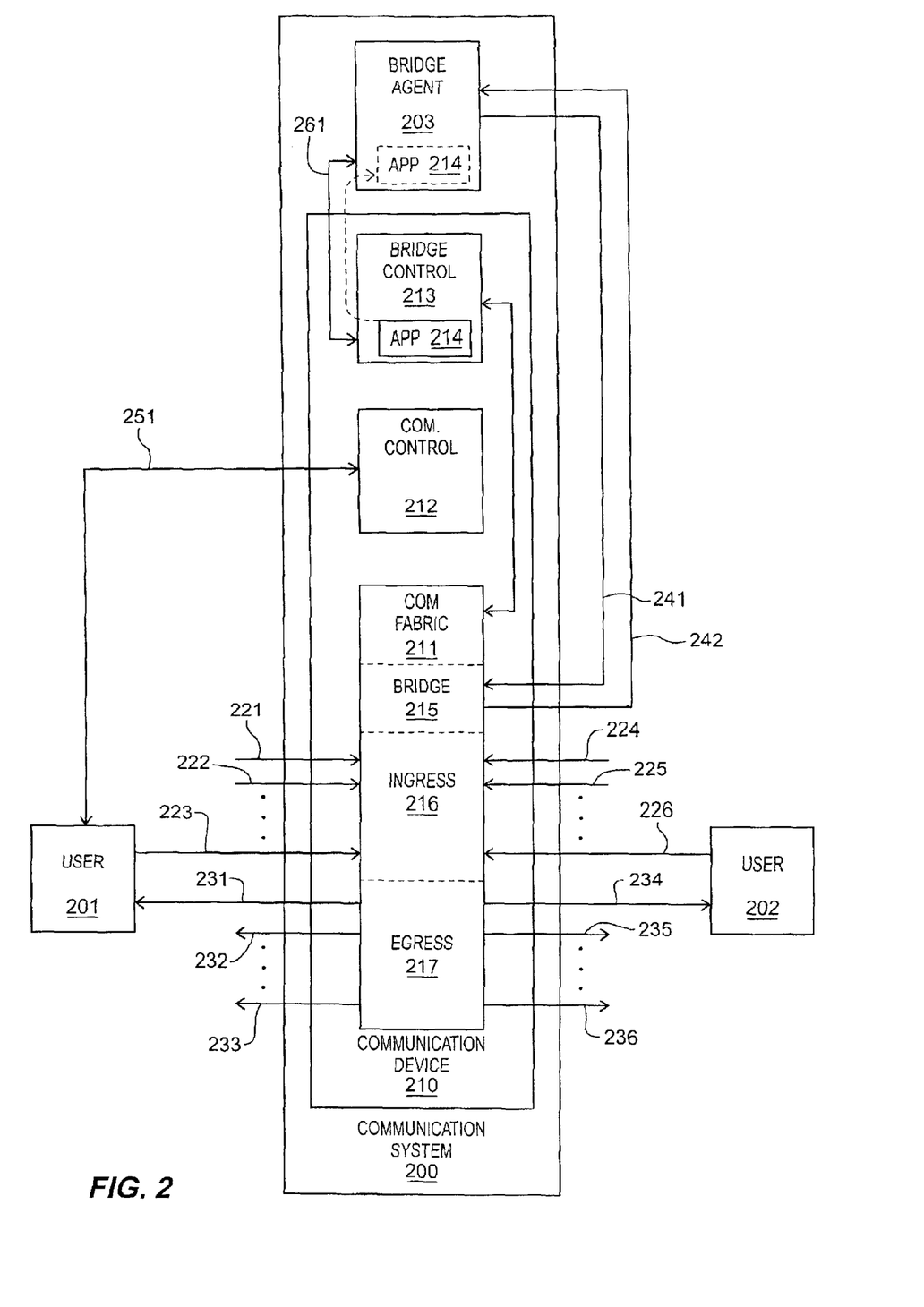
FIG. 2 illustrates a communication system in an example of the invention.
Figure 3:
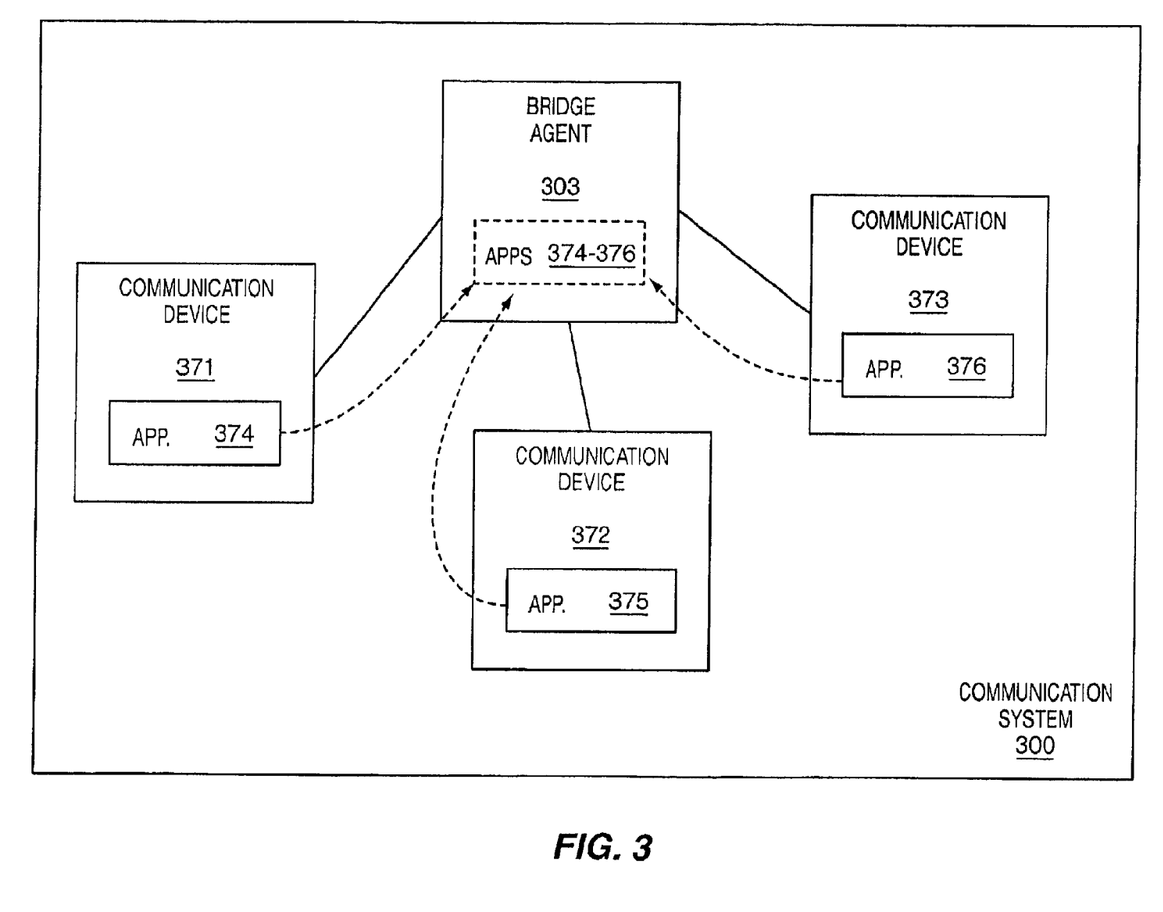
FIG. 3 illustrates a communication system in an example of the invention.

System Configuration—FIGS. 1–3

FIG. 1 illustrates communication system 100 in an example of the invention. FIG. 1 illustrates a variety of possible communication bridges, and not all types of communication bridges are required in each example of the invention. Communication system 100 includes bridge agent 103 and communication device 110. User 101 is coupled to communication device 110 by links 121 and 124. User 102 is coupled to communication device 110 by links 122 and 123. Bridge agent 103 is coupled to communication device 110 by links 141–144.

The links may include switches, routers, protocol converters, or other communication devices. The links may include optical, wireless, metallic, or other types of transport media. The links may utilize time division multiplex, asynchronous transfer mode, internet protocol, synchronous optical network, code division multiple access, or other protocols. The links may be integrated together—for example, links 121 and 124 may be a single bidirectional link.

Communication device 110 transfers user communications from user 101 to user 102 over links 121–122. Communication device 110 may provide bridge 131 to transfer a copy of the user communications to bridge agent 103 over link 141. Communication device 110 may also transfer user communications from user 102 to user 101 over links 123–124. Communication device 110 may provide bridge 133 to transfer a copy of these user communications to bridge agent 103 over link 143. Communication device 110 may provide bridge 132 to transfer agent communications from bridge agent 103 over link 122 to user 102. Communication device 110 may provide bridge 134 to transfer agent communications from bridge agent 103 over link 144 to user 101.

Communication device 110 establishes bridges 131–134 in response to commands indicating the applicable links or users. The commands may include information that identify the links or users related to the bridge. This identifying information may include network addresses, user names, circuit identifiers, virtual connections, port numbers, and telephone numbers. Network addresses may include Internet addresses, MAC addresses, Ethernet addresses, e-mail addresses, or other such information. Bridges related to User 101 may be implemented by indicating identifying information for the users or links as illustrated in the following table.

| TRANSFER USER COM. FROM | TRANSFER USER COM. TO | BRIDGE AGENT COM. FROM | BRIDGE USER/AGENT COM. TO |
|---|---|---|---|
| LINK 121 | ANY LINK | NONE | LINK 141 |
| ANY LINK | LINK 124 | NONE | LINK 143 |
| LINK 121 | LINK 122 | NONE | LINK 141 |
| LINK 123 | LINK 124 | NONE | LINK 143 |
| USER 101 | ANY USER | NONE | LINK 141 |
| ANY USER | USER 101 | NONE | LINK 143 |
| USER 101 | USER 102 | NONE | LINK 141 |
| USER 102 | USER 101 | NONE | LINK 143 |
| LINK 121 | ANY LINK | LINK 142 | ANY LINK |
| ANY LINK | LINK 124 | LINK 144 | LINK 124 |
| LINK 121 | LINK 122 | LINK 142 | LINK 122 |
| LINK 123 | LINK 124 | LINK 144 | LINK 124 |
| USER 101 | ANY USER | LINK 142 | ANY USER |
| ANY USER | USER 101 | LINK 144 | LINK 124 |
| USER 101 | USER 102 | LINK 142 | LINK 122 |
| USER 102 | USER 101 | LINK 144 | LINK 124 |

FIG. 2 illustrates communication system 200 in an example of the invention. Communication system 200 includes bridge agent 203 and communication device 210. Bridge agent 203 is comprised of computer and communications systems that may have components located in different geographic areas and operated by different entities. Based on this disclosure, those skilled in the art will readily appreciate how to modify conventional computer and communication devices to arrive at bridge agent 203.

Communication device 210 includes communication fabric 211, communication control 212, and bridge control 213. Communication fabric 211 includes bridge fabric 215, ingress fabric 216, and egress fabric 217. Based on this disclosure, those skilled in the art will readily appreciate how to modify conventional switches, routers, bridges, and other communication devices to arrive at communication device 210.

Ingress fabric 216 is coupled to links 221–226, and egress fabric 217 is coupled to links 231–236. Bridge fabric 215 is coupled to links 241–242. User 201 is coupled to links 223 and 231. User 202 is coupled to links 226 and 234. Bridge agent 203 is coupled to links 241 and 242. The links may include switches, routers, protocol converters, or other communication devices. The links may include optical, wireless, metallic, or other types of transport media. The links may utilize time division multiplex, asynchronous transfer mode, internet protocol, synchronous optical network, code division multiple access, or other protocols. The links may be integrated together—for example, links 223 and 231 may be a single bidirectional link.

User 201 is coupled to communication control 212 over control channel 251. Control channel 251 could be any media that transfers control information and could reside within links 223 and 231. Communication control 212 receives commands over control channel 251. Communication control 212 translates the commands into control signals for communication fabric 211. Communication fabric 211 routes user communications from ingress fabric 216 to egress fabric 217 in response to the control signals. For example, the control signals may direct communication fabric 211 to route a communication packet from link 223 to link 234 based on a packet address.

Bridge agent 203 is coupled to bridge control 213 over control channel 261. Communication device 210 includes a separate physical port for control channel 261. The separate physical port may be important for security purposes. Control channel 261 could comprise any media that transfers control information—although control channel 261 typically uses a highly secure form of communication.

Bridge control 213 includes software application 214. As indicated by the dashed lines, bridge control 213 is configured to transfer application 214 to bridge agent 203 over control channel 261. This transfer could occur automatically in response to the establishment of control channel 261. Software application 214 could be an Application Programming Interface (API) that translates bridge requests from a common format into bridge commands that have a unique format customized for communication device 210.

Bridge agent 203 executes application 214 to transfer commands over control channel 261 to implement communication bridges in communication device 210. Bridge control 213 receives and processes the bridge commands to generate control signals for communication fabric 211. Communication fabric 211 may copy user communications from ingress fabric 216 to bridge fabric 215 in response to the control signals. For example, the control signals may direct communication fabric 211 to copy a communication packet routed from link 223 to link 234 and transfer the packet copy to bridge agent 203 through bridge fabric 215 and link 242.

It may be desirable to logically or physically separate communication control 212 from bridge control 213, and physical separation may be required by law. In this scenario, communication control 212 would remain ignorant of bridge operations and would not be aware of control channel 261, bridge fabric 215, and links 241–242. Bridge control 213 would be unable to affect the operations of communication control 212. Thus, neither communication control 212 nor bridge control 213 could interfere with the operation of the other. Different bridge agents would also be unaware of one another. This separation of control would help prevent improper control malfunctions in communication bridges and other services.

FIG. 3 illustrates communication system 300 in an example of the invention. Communication system 300 is comprised of bridge agent 303 and communication devices 371–373 that may all be configured to operate as described above. Communication devices 371–373 respectively include software applications 374–376 that are transferred to bridge agent 303 for execution. Each application translates bridge requests with a common format into bridge commands that are customized for their respective communication device.

Communication devices 371–373 are each from a different manufacturer, and thus, each communication device uses a different bridge control system that has proprietary bridge control commands. Applications 374–376 are different from one another in that they are customized to interface with their respective proprietary bridge control system. Advantageously, applications 374–376 are similar to one another in that they are standardized to interface in the same way with bridge agent 303. As a result, bridge agent 303 can use the same format to generate bridge requests for communication devices 371–373, and applications 374–376 translate these bridge requests into different bridge commands that have a unique format customized for each respective communication device 371–373.

Communication system 300 may provide the same bridge agent interface specification to each manufacturer, and let each manufacturer provide an application that interfaces between bridge agent 303 and their own proprietary bridging systems. Thus, bridge agent 303 is simplified because it can have a single interface that executes the applications 374–376 to implement bridges among diverse communication devices 371–373. If different communication devices deliver the same applications to bridge. agent 303, then bridge agent 303 may discard redundant application code while maintaining separate state information for each device.

In FIGS. 1–3, the bridge agents and communication devices may use instructions that are stored on storage media. The instructions can be retrieved and executed by a processor. Some examples of instructions are software, script, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 4:
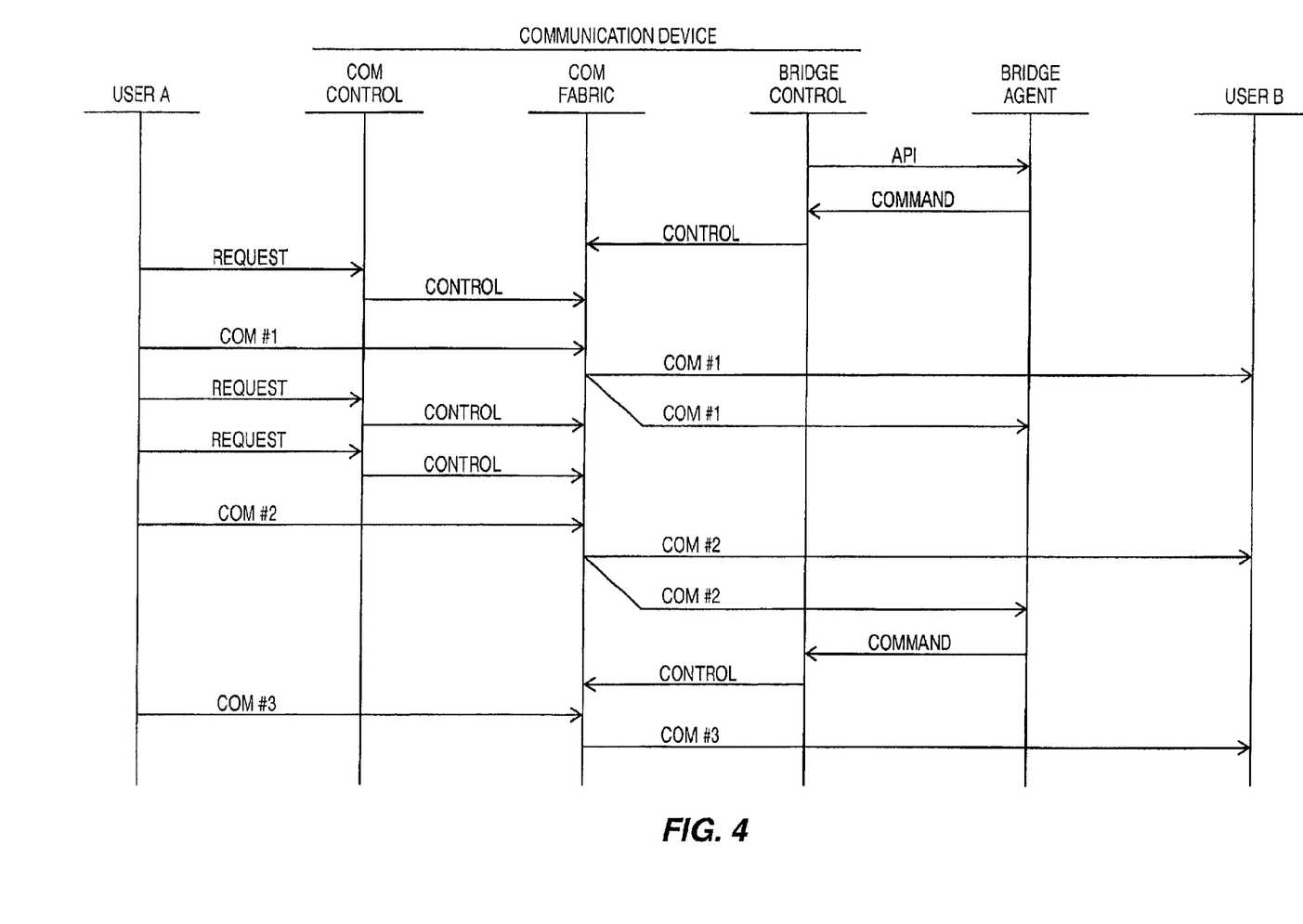
FIG. 4 illustrates communication system operation in an example of the invention.
Figure 5:
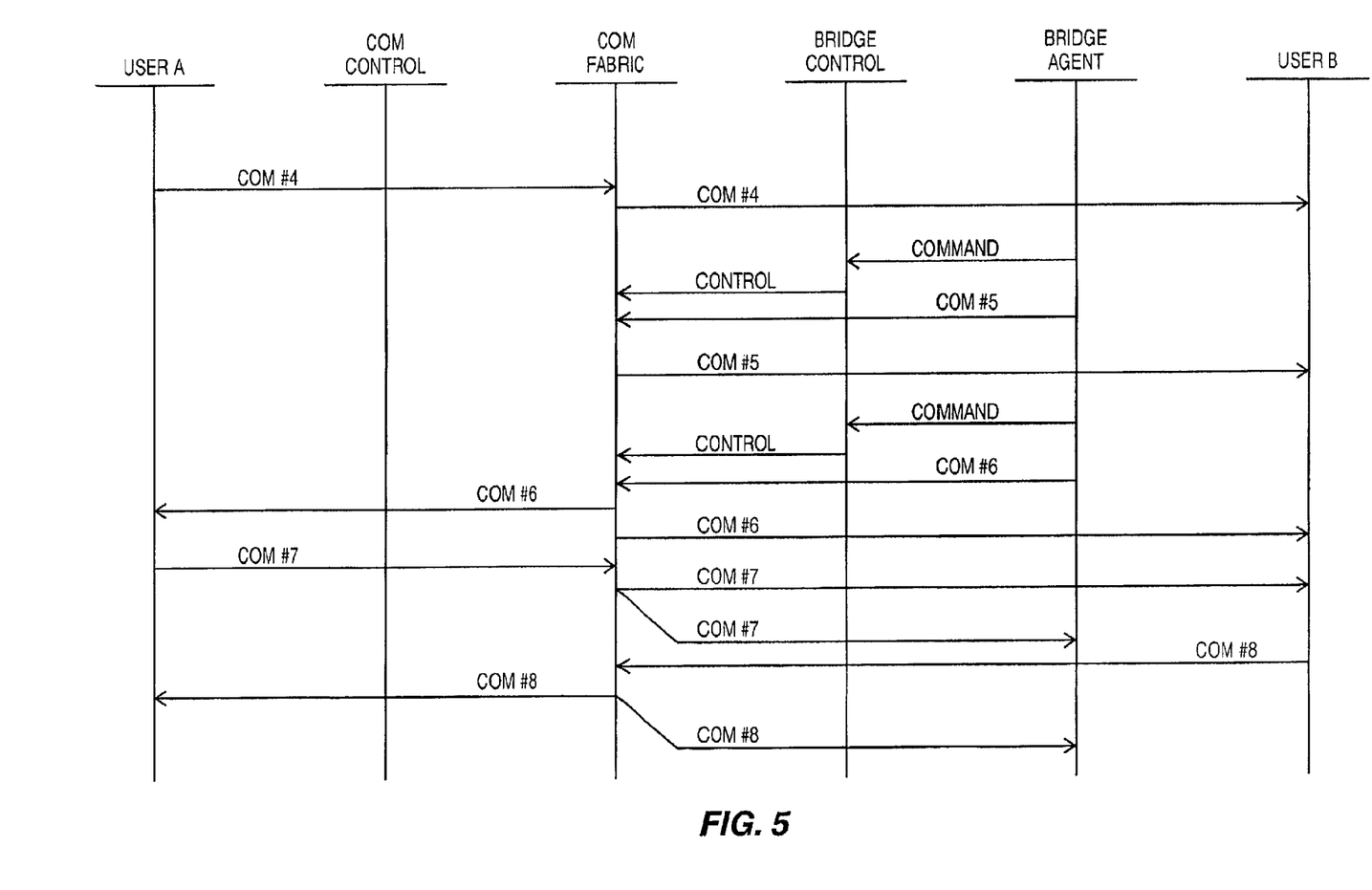
FIG. 5 illustrates communication system operation in an example of the invention.

System Operation—FIGS. 3–4

FIGS. 3–4 illustrate communication system operation in an example of the invention. Initially, the bridge control in a communication device transfers its bridging application to a bridge agent, possibly in response to the establishment of the bridge control channel. Based on the application, the bridge agent transfers a command to bridge control. Bridge control processes the command to transfer corresponding control signals to the communication fabric. The communication fabric configures itself to implement the desired bridge—in this case to bridge all user communications transferred between user A and user B to the bridge agent.

Subsequently, user A requests communication service from communication control in the communication device. Communication control processes the request to transfer corresponding control signals to the communication fabric. The communication fabric configures itself to provide the communication service in response to the control signals. User A sends a first communication to the communication fabric in the communication device. The communication fabric routes the first communication to user B. The communication fabric also transfers a copy of the first communication to the bridge agent.

User A may then request an end of the communication service from communication control. Communication control processes the request to transfer corresponding control signals to the communication fabric. The communication fabric configures itself to stop communication service for User A in response to the control signals.

Subsequently, user A again requests communication service from communication control in the communication device. Communication control processes the request to transfer corresponding control signals to the communication fabric. The communications fabric configures itself to provide the communication service in response to the control signals. User A sends a second communication to the communication fabric in the communication device. The communication fabric routes the second communication to user B. Because the bridge agent has not taken down the bridge, the communication fabric also transfers a copy of the second communication to the bridge agent.

The bridge agent then transfers a command to bridge control to take down the bridge. Bridge control processes the command to transfer corresponding control signals to the communication fabric. The communication fabric configures itself to take down the bridge. Subsequently, user A sends a third communication to the communication fabric in the communication device. The communication fabric routes the third communication to user B. Since the bridge is down, the communication fabric does not transfer a copy of the third communication to the bridge agent.

On FIG. 4, user A sends a fourth communication to the communication fabric in the communication device. The communication fabric routes the fourth communication to user B. Since the bridge is still down, the communication fabric does not transfer a copy of the fourth communication to the bridge agent.

The bridge agent then transfers a command to bridge control. Bridge control processes the command to transfer corresponding control signals to the communication fabric. The communication fabric configures itself to implement the desired bridge—in this case to bridge agent communications from the bridge agent to user B. The bridge agent transfers a fifth communication to the communication fabric. In response to the control signals, the communication fabric transfers the fifth communication to user B.

The bridge agent transfers another command to bridge control. Bridge control processes the command to transfer corresponding control signals to the communication fabric. The communications fabric configures itself to implement the desired bridge—in this case to bridge all user communications between users A and B to the bridge agent and to bridge agent communications from the bridge agent to users A and B. The bridge agent transfers a sixth communication to the communication fabric. In response to the control signals, the communication fabric transfers the sixth communication to both users A and B. User A sends a seventh communication to the communication fabric. The communication fabric routes the seventh communication to user B. The communication fabric also transfers a copy of the seventh communication to the bridge agent. User B sends an eighth communication to the communication fabric. The communication fabric routes the eighth communication to user A. The communication fabric also transfers a copy of the eighth communication to the bridge agent.

The communication system could provide required copies of user communications to law enforcement agencies. For example, the FBI may operate the bridge agent to tap user communications where probable cause exists for surveillance. The FBI may have the communication system operate some components of the bridge agent.

The communication system could provide an operator center with an interface to interrupt user communications. For example, an operator may desire to communicate with users in a busy line verification or interrupt operation. This typically occurs when users are busy communicating with one another and the immediate attention of one of the users is required to respond to an emergency. The operator interrupts the user communications to bring the emergency to the attention of the user.

Separate bridge agents could operate at the same time for law enforcement agencies and operator systems. Each bridge agent would have separate control channels and links.

FIGS. 1–5 and the above description depict specific examples of a communication system in accord with the present invention. Those skilled in the art will appreciate that some conventional aspects of the communication system have been simplified or omitted for clarity. Those skilled in the art will appreciate that the features described above could be combined in various ways to form multiple variations of the invention. Those skilled in the art will also appreciate variations of the communication system that fall within the scope of the invention. As a result, the invention is not limited to the specific examples described above, but only by the following claims and their equivalents.

We claim:

1. A method of operating a communication system, the method comprising:

executing a first software application in a bridge agent to translate a first bridge request into a first bridge command;

transferring the first bridge command from the bridge agent to a first communication device wherein the first communication device receives the first bridge command through a first physical port dedicated to bridge control;

processing the first bridge command in the first communication device to implement a first bridge;

executing a second software application in the bridge agent to translate a second bridge request into a second bridge command;

transferring the second bridge command from the bridge agent to a second communication device; and processing the second bridge command in the second communication device to implement a second bridge.

2. The method of claim 1 further comprising automatically transferring the first software application from the first communication device to the bridge agent in response to an operational control channel between the first communication device and the bridge agent.

3. The method of claim 1 wherein the first bridge copies all user communications transferred from a first user to a link and transfers the copies to the bridge agent.

4. The method of claim 1 wherein the first bridge copies all user communications transferred from a link to a first user and transfers the copies to the bridge agent.

5. The method of claim 1 wherein the first bridge transfers agent communications from the bridge agent to a first user.

6. The method of claim 1 wherein the first communication device and the second communication device are from different manufacturers.

7. The method of claim 1 wherein the first bridge request and the second bridge request have the same format and the first bridge command and the second bridge command have different formats.

8. A method of operating a communication device, the method comprising:

automatically transferring a software application from the communication device to a bridge agent in response to an operational control channel between the communication device and the bridge agent;

receiving a bridge command from the bridge agent into the communication device through a physical port dedicated to bridge control; and processing the bridge command in the communication device to implement a bridge.

9. The method of claim 8 wherein the bridge copies all user communications transferred from a user to a link and transfers the copies to the bridge agent.

10. The method of claim 8 wherein the bridge copies all user communications transferred from a link to a user and transfers the copies to the bridge agent.

11. The method of claim 8 wherein the bridge transfers agent communications from the bridge agent to a user.

12. A communication system comprising:

a bridge agent configured to execute a first software application to translate a first bridge request into a first bridge command and transfer the first bridge command, and to execute a second software application to translate a second bridge request into a second bridge command and transfer the second bridge command;

a first communication device configured to receive the first bridge command through a first physical port dedicated to bridge control and process the first bridge command to implement a first bridge; and a second communication device configured to receive the second bridge command through a second physical port dedicated to bridge control and process the second bridge command to implement a second bridge.

13. The communication system of claim 12 wherein the first communication device is configured to automatically transfer the first software application to the bridge agent in response to an operational control channel between the first communication device and the bridge agent.

14. The communication system of claim 12 wherein the first bridge copies all user communications transferred from a first user to a link and transfers the copies to the bridge agent.

15. The communication system of claim 12 wherein the first bridge copies all user communications transferred from a link to a first user and transfers the copies to the bridge agent.

16. The communication system of claim 12 wherein the first bridge transfers agent communications from the bridge agent to a first user.

17. The communication system of claim 12 wherein the first communication device and the second communication device are from different manufacturers.

18. The communication system of claim 12 wherein the first bridge request and the second bridge request have the same format and the first bridge command and the second bridge command have different formats.

19. A communication device comprising:

a physical port dedicated to a bridge agent; and a bridge control coupled to the physical port and configured to automatically transfer a software application to the bridge agent in response to an operational control channel between the physical port and the bridge agent, and to receive and process a bridge command to generate control signals; and a communication fabric configured to implement a bridge in response to the control signals.

20. The communication device of claim 19 wherein the bridge copies all user communications transferred from a user to a link and transfers the copies to the bridge agent.

21. The communication device of claim 19 wherein the bridge copies all user communications transferred from a link to a user and transfers the copies to the bridge agent.

22. The communication device of claim 19 wherein the bridge transfers agent communications from the bridge agent to a user.

* * * * *